Aug. 28, 1951     G. W. SINCLAIR     2,565,744
UNIBOLT COUPLING

Filed April 23, 1949     3 Sheets-Sheet 1

INVENTOR.
GEORGE W. SINCLAIR
BY
*Mellin & Hanson*
ATTORNEYS

Aug. 28, 1951 — G. W. SINCLAIR — 2,565,744
UNIBOLT COUPLING
Filed April 23, 1949 — 3 Sheets-Sheet 2

INVENTOR.
GEORGE W. SINCLAIR

Aug. 28, 1951  G. W. SINCLAIR  2,565,744
UNIBOLT COUPLING

Filed April 23, 1949  3 Sheets-Sheet 3

INVENTOR.
GEORGE W. SINCLAIR
BY
Mellin + Hansen
ATTORNEYS

Patented Aug. 28, 1951

2,565,744

UNITED STATES PATENT OFFICE 2,565,744

UNIBOLT COUPLING

George W. Sinclair, Los Angeles, Calif., assignor to M. O. Johnston, Glendale, Calif.

Application April 23, 1949, Serial No. 89,328

6 Claims. (Cl. 285—22)

This invention relates to an hydraulic device of the type comprising an upright cylinder, a liner disposed concentrically within and spaced from the liner, a piston reciprocable within the liner, and a wire line operated by the piston and fixed at one end thereto and extending through one end of the cylinder. More particularly, this invention relates to coupling means for coupling the upper and lower sections of an hydraulic device of the character described.

In providing hydraulic means for operating well drilling and servicing rigs, one form of apparatus involves the use of a pair of upright cylinders of the character referred to. Such cylinders constitute legs or major structural supporting members of the derrick as well as hydraulic device for operating the rig. In such a rig, the cylinders are of great height; for example, about 100 feet in height. Accordingly, it is advantageous to form the cylinders in sections and to assemble the sections at the well.

The sectional construction of cylinders of the character referred to presents problems, such as providing a pressure-tight seal between the upper and lower sections of the cylinders and between the upper and lower sections of the liner.

It is an object of the present invention to provide coupling means for coupling together the upper and lower sections of an hydraulic device of the character described.

It is a particular object of the invention to provide means for coupling the upper and lower sections of an hydraulic device of the character described comprising an outer cylinder and an inner liner and means for guiding the upper and lower sections into accurate alignment with one another and forming a pressure-tight seal therebetween.

These and other objects of the invention will be apparent from the ensuing description and the appended claims.

One form which the invention may assume is exemplified in the following description and illustrated by way of example in the accompanying drawings, in which.

Figure 1:
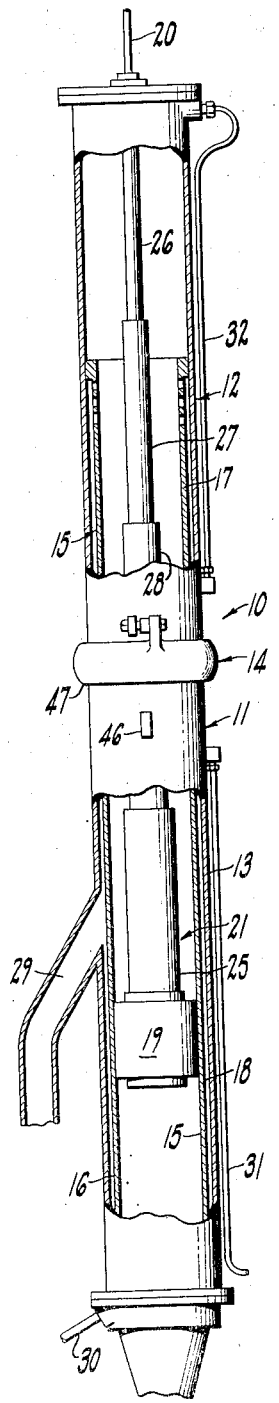
Fig. 1 is a diagrammatic view, partly in section and partly in elevation, of the hydraulic device of the invention.
Figure 2:
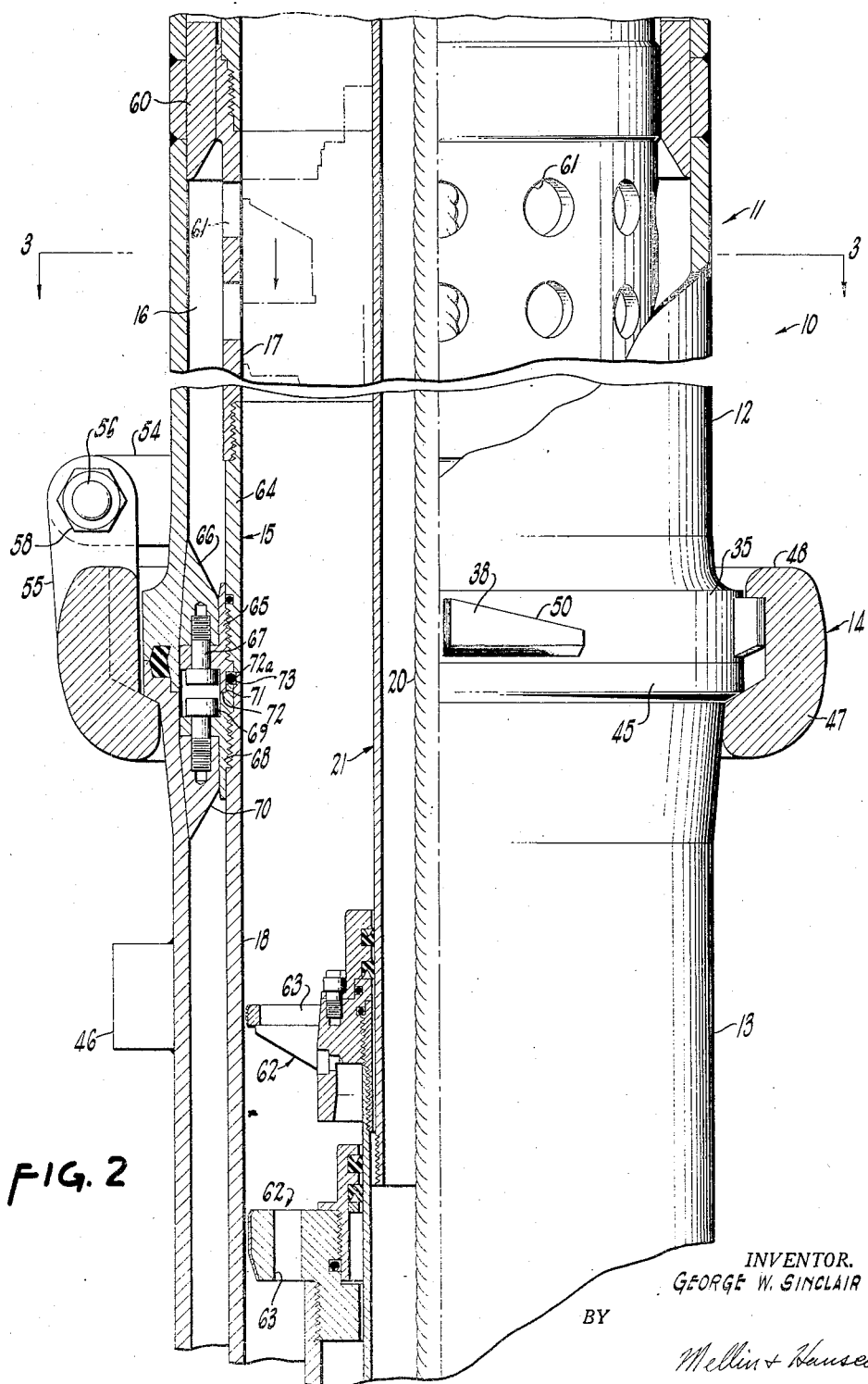
Fig. 2 is a fragmentary view on a larger scale than that of Fig. 1, showing the cylinder partly in vertical section and partly in side elevation.

Referring now to the drawings, and more particularly to Fig. 1, the hydraulic device of the invention is generally designated as 10 and it comprises a cylinder 11 including an upper section 12 and a lower section 13 coupled at 14. A liner 15 is disposed concentrically within the cylinder 11 and is spaced therefrom to provide an annular space 16. The liner comprises an upper section 17 and a lower section 18. A piston 19 is reciprocable in the liner and is employed to operate a wire line 20, which may be led over suitable sheaving (not shown) and connected to a hook (not shown) for pulling pipe or doing other operations about an oil well. The wire line 20 is sheathed by means of a group of nestable tubes generally designated as 21, including an outermost tube 25 fixed to the piston, an innermost tube 26 fixed to the upper end of the cylinder and intermediate tubes 27 and 28. Such tubes are of the type described in Mason United States Patent No. 2,240,794, granted May 6, 1941, entitled "Drilling Lift," and, as is well known in the art, they are in slidable, sealing engagement with one another, permit a long stroke of the piston and effectively seal the wire line.

The cylinder 11 is provided near its lower end with a fluid pressure line 29 communicating with the annular space 16 and it is also provided with an air-pressure line 30 and with air-bleed lines 31 and 32 which are coupled in the manner described hereinafter.

Referring now more particularly to Figs. 2 to 5, the upper section 12 of the cylinder 11 is formed at its lower end with a flange 35 having an annular groove 36 to receive an annular sealing member 37. Male threads or cam members 38 are formed on the exterior of the flange 35 and machined lugs or pilot members 39 are welded to the interior surface of the flange 35 in radially spaced relationship. The lower section 13 of the cylinder 11 is formed at its upper end with a flange 45 and lugs 46. A nut 47 having an annular groove or female thread 48 and vertical recesses or openings 49 is confined between the flange 45 and the lugs 46.

It will be apparent that, when the upper section 12 is lowered onto the lower section 13, pilot members 39 will guide the upper section into accurate alignment with the lower section. When the nut 47 is raised to seat the male threads or cam members 38 in the female thread or groove 48 (openings 49 serving the purpose of allowing access of the male threads 38 to the female thread 48), and the nut is then rotated clockwise as viewed in Fig. 2, the cam surfaces 50 formed on the cams 38 will serve to tighten the nut and to draw the flanges 35 and 45 tightly together and will also cause the sealing member 37 to seat in a recess 51 formed in the lower flange 45. It will also be noted that a tongue 52 is formed on the upper flange 35 which will seat in a recess 53 formed in the lower flange 45. Thus, it will be apparent that accurate alignment of the upper and lower sections of the cylinder and a pressure-tight fit therebetween will be effected. Lugs or ears 54 and 55 are formed on the upper section of the cylinder and the nut 47, respectively, and in order to tighten the nut 47, a bolt 56 is passed through openings 57 formed in the lugs 54 and 55 and nuts 58 are tightened.

The upper section 17 of the liner is centered by means of an annular collar or spacer 60 fixed to the cylinder 11, and it will be noted that the liner is formed with openings 61 for passage of fluid between the annular space 16 and the interior of the liner. It will be noticed that the annular collar or spacer 60 is formed with a tapered or conically bored lower end and that the bore of the annular collar or spacer 60 coincides with the external diameter of a portion of the liner which is enlarged slightly in diameter with respect to the rest of the liner. The tapered bore of the spacer 60 enables the liner to be projected endwise into the cylinder section, and when the enlarged diameter of the liner engages the tapered lower end of the spacer 60, it will be automatically centered in the cylinder section, and the enlarged diameter of the liner will properly seat within the bore of the spacer 60. This construction requires that only short areas of the liner need to be truly accurately machined externally and yet will properly axially center the entire liner within the cylinder sections. It will also be noted that the nestable tubes 21 are provided with flanges 62 for guiding the tubes in the liner 15, and that openings 63 are formed in the flanges for passage of fluid to and from the piston. Details of construction of the tubes 21 and their fittings will be found in copending application of Blaine Johnston et al., Serial No. 89,327, filed April 23, 1949, entitled "Nestable Tube Device."

At its lower end, the upper section 17 of the liner 15 is threaded to a coupling member 64. The latter is threaded at its lower end to a flange 65. Lugs 66 are welded to the interior of flange 35 in radially spaced relationship and the flange 65 is secured thereto by means of screws 67 so as to accurately align the lower end of the upper section of the liner with the cylinder and to hold it firmly in place. Similarly, the upper end of the lower section 18 of the liner is threaded to a flange 68 which is fixed by means of screws 69 to lugs 70 which are welded to the interior surface of the lower flange 45. The flange 65 is formed with a depending tongue 71 which seats in a recess 72 formed in the flange 68. As illustrated, an O ring or other suitable annular sealing member 72a is seated in a recess 73 between the adjoining ends of the liner sections.

Figures 3, 4, 5:
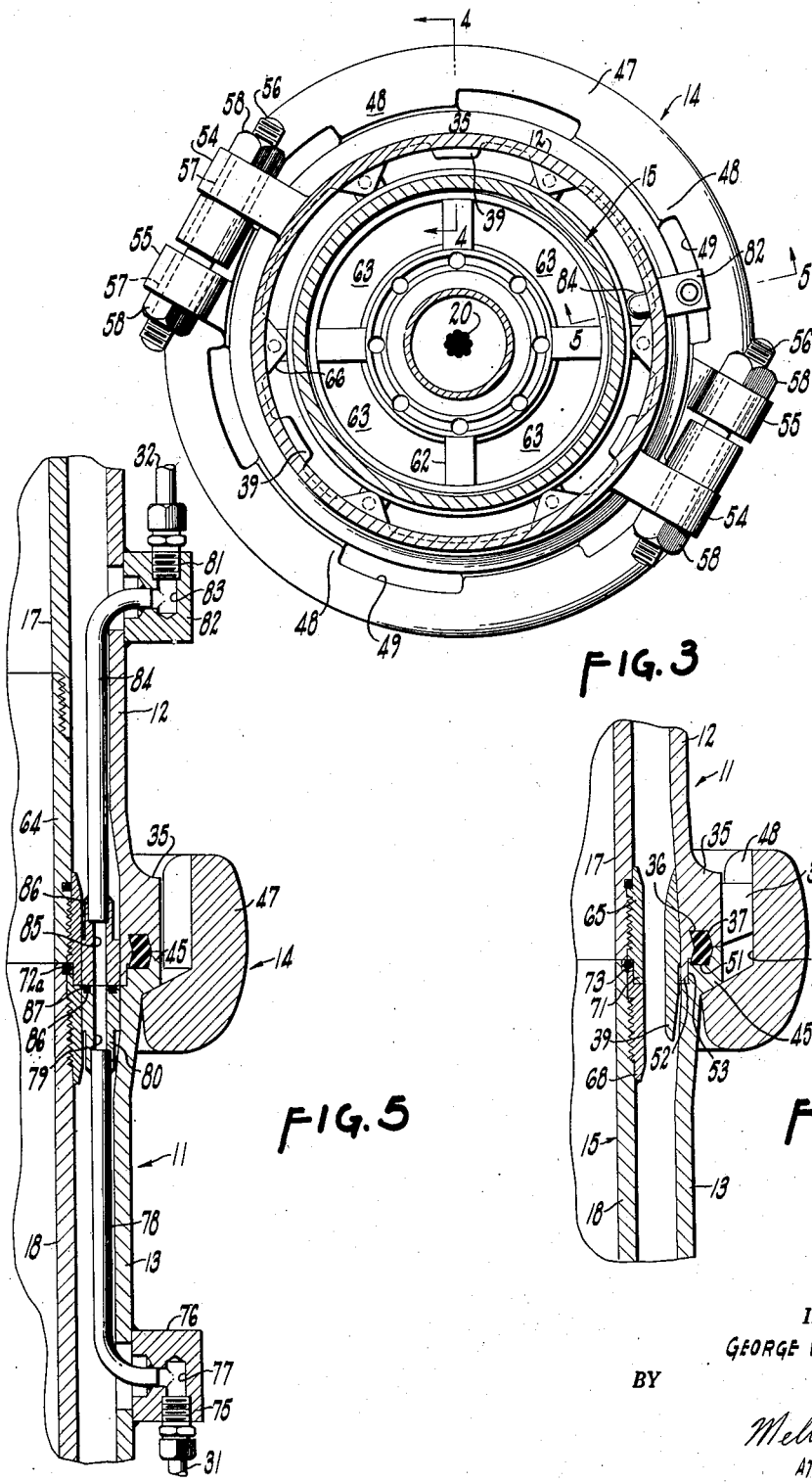
Fig. 3 is a horizontal section taken along the line 3—3 of Fig. 2, showing the coupling means in top-plan view.
Fig. 4 is a section taken along the line 4—4 of Fig. 3, showing the pilot means for guiding the upper and lower sections of the cylinder and liner into accurate alignment with one another and for forming a pressure-tight seal therebetween.
Fig. 5 is a section taken along the line 5—5 of Fig. 3, showing the means for making a pressure-tight connection between the upper and lower sections of the air-bleed line.

The lower and upper air-bleed lines 31 and 32 are coupled as illustrated in Fig. 5. Thus, the lower line 31 is threaded at 75 in a lug 76 which is welded to the lower section 13 of the cylinder 11. The lug 76 is formed with a passage 77 communicating the line 31 with one end of a connecting tube 78, the other end of which is seated in a passage 79 formed in a lug 80 which is welded to the lower section 13 of the cylinder 11. Similarly, the upper line 32 is threaded at 81 in a lug 82 which is welded to the upper section 12 of the cylinder 11, and the lug 82 is formed with a passage 83 communicating the line 32 with one end of a connecting tube 84, the other end of which is seated in a passage 85 formed in a lug 86 which is welded to the upper section 12 of the cylinder 11. An annular sealing member 86 is seated in a groove 87 formed in the lug 80.

It will thus be apparent that, by the means illustrated in Fig. 5 and described hereinabove, the air-bleed line can be broken into upper and lower sections when the cylinder is disassembled, and that when the cylinder is assembled the upper and lower sections of the air-bleed line will be accurately aligned with one another and a pressure-tight seal therebetween will be provided.

The means described hereinabove for guiding and sealing the upper and lower sections of the cylinder and liner and of the air-bleed line have been described with reference to a particular type of coupling employing a ring nut and cams. However, it will be apparent that the guiding and sealing means of the invention are equally applicable to an ordinary flange-and-bolt coupling.

It is thus apparent that an hydraulically operable device of the character described is provided, such device comprising a cylinder and a liner disposed concentrically within the cylinder, such cylinder and liner being sectional in construction, and that coupling means is provided for the upper and lower sections of the cylinder and liner. Thus, the coupling means brings the upper and lower sections of the cylinder and liner into accurate alignment and forms a pressure-tight seal therebetween. Also means is provided for breaking an air-bleed line and for coupling the sections of the air line together in proper alignment to form a pressure-tight seal.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Apparatus of the character described comprising a sectional cylinder, a sectional tubular liner disposed within the cylinder, means for coupling the sections of the cylinder together and means for guiding the sections of the liner into accurate alignment and for forming a pressure-tight seal therebetween comprising overlapping annular coupling members at adjacent ends of the liner sections adapted to seat together to accurately align the liner sections and to form a pressure-tight seal therebetween, and other means for accurately aligning the adjacent ends of the liner sections with respect to the cylinder and with respect to each other, said other means comprising a plurality of lugs fixed to and radially spaced about the interior surface of the cylinder, radially projecting members fixed to the adjacent ends of the liner sections and screw means securing said radial members to said lugs.

2. Apparatus of the character described comprising a cylinder constructed of upper and lower sections, means for coupling said sections and air passage means for the upper end of the cylinder comprising an upper conduit, a lower conduit and coupling means for the same and for providing a pressure-tight seal therebetween, said coupling means comprising cooperable coupling members fixed to adjacent ends of said upper and lower conduits and adapted to seat together when the upper and lower sections of the cylinder are coupled.

3. Apparatus of the character described comprising a cylinder constructed of upper and lower sections, means for coupling said sections, a tubular liner disposed within and spaced from said cylinder to provide an annular space therebetween, said liner being constructed of upper and lower sections adapted to seat together and to form a pressure-tight seal when the upper and lower sections of the cylinder are coupled, and air-passage means for the upper end of the cylinder comprising an upper conduit disposed externally and longitudinally of the upper section of the cylinder, a lower conduit disposed externally and longitudinally of the lower section of the cylinder, and coupling means for said conduits comprising a connector tube for each said conduit extending through the wall of the cylinder and a coupling member at the end of each connector tube disposed within said annular space, said coupling members being provided with annular sealing means and being adapted to seat together to communicate said connector tube and to provide a pressure-tight seal therebetween when the upper and lower sections of the cylinder are coupled.

4. Apparatus of the character described comprising a cylinder formed of axially aligned sections, a sectional tubular liner disposed within the cylinder and formed of axially aligned sections one section being disposed and fixed within each section of the cylinder, complementary interengaging annular means between the adjacent ends of each cylinder section for maintaining said sections in axial alignment when the same are drawn together, packing means interposed between the adjacent ends of the cylinder sections, means for coupling the adjacent ends of the cylinder sections together and simultaneously compressing said packing to form a fluid-tight joint therebetween, pilot lugs fixed to one of said cylinder sections at the interior perimeter thereof and projecting axially beyond the end of said cylinder section to engage the interior periphery of the adjacent end of the other cylinder section to guide it into axial registration with the adjacent end of the other cylinder section.

5. Apparatus of the character described comprising a cylinder formed of axially aligned sections, a sectional tubular liner disposed within the cylinder and formed of axially aligned sections one section being disposed and fixed within each section of the cylinder, complementary interengaging annular means between the adjacent ends of each cylinder section for maintaining said sections in axial alignment when the same are drawn together, packing means interposed between the adjacent ends of the cylinder sections, means for coupling the adjacent ends of the cylinder sections together and simultaneously compressing said packing to form a fluid-tight joint therebetween, interengaging complementary annular means at the adjacent ends of the liner sections adapted to engage when the ends of the cylinder sections are coupled to axially register and align the liner sections, means for securing the liner sections in the cylinder sections comprising radially outward projecting lugs fixed to each liner section at a point short of its end and radially inwardly projecting lugs on each cylinder section spaced axially inward of the lugs of the liner sections and in registry therewith, and means for securing the lugs of the liner sections to the lugs of the cylinder sections.

6. Apparatus of the character described comprising a cylinder formed of axially aligned sections, a sectional tubular liner disposed within the cylinder and formed of axially aligned sections one section being disposed and fixed within each section of the cylinder, complementary interengaging annular means between the adjacent ends of each cylinder section for maintaining said sections in axial alignment when the same are drawn together, packing means interposed between the adjacent ends of the cylinder sections, means for coupling the adjacent ends of the cylinder sections together and simultaneously compressing said packing to form a fluid-tight joint therebetween, means for coaxially positioning the liner section in its cylinder section and maintaining it so positioned including an internal annular spacer fixed in the cylinder intermediate its ends and a diametrically enlarged annular surface on the liner engaging the annular inner surface of the spacer, complementary radially extending registering lugs fixed interiorly of the cylinder and exteriorly of the liner adjacent the ends of the cylinder and liner sections, and screw means connecting said complementary lugs together.

GEORGE W. SINCLAIR.

REFERENCES CITED

The following references are of record in the file of this patent:

UNITED STATES PATENTS

| Number | Name | Date |
|---|---|---|
| 1,217,543 | White | Feb. 27, 1917 |
| 1,288,631 | McFarland | Dec. 24, 1918 |
| 2,101,406 | McKeever | Dec. 7, 1937 |